(12) United States Patent
Fink et al.

(10) Patent No.: US 6,219,354 B1
(45) Date of Patent: Apr. 17, 2001

(54) VDSL CABINET DESIGNS AND CONFIGURATIONS

(75) Inventors: Richard H. Fink, Aurora; David J. Arens; Bruce A. Phillips, both of Highlands Ranch, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/223,127

(22) Filed: Dec. 30, 1998

(51) Int. Cl.[7] .............................. H04L 12/66; H04J 3/12; H04J 3/02; H04M 11/00
(52) U.S. Cl. .................... 370/463; 370/527; 370/537; 379/93.09
(58) Field of Search ..................................... 370/264, 420, 370/463, 465, 493, 524, 527, 529, 535, 537; 379/93.09

(56) References Cited

U.S. PATENT DOCUMENTS

| | | | |
|---|---|---|---|
| 5,150,247 | * 9/1992 | Sharpe et al. | 359/135 |
| 5,355,401 | * 10/1994 | Skinner, Sr. | 379/56 |
| 5,528,283 | * 6/1996 | Burton | 348/13 |
| 5,682,385 | * 10/1997 | Garcia et al. | 370/458 |
| 5,726,788 | * 3/1998 | Fee et al. | 359/163 |
| 5,917,814 | * 6/1999 | Balatoni | 370/352 |
| 5,991,140 | * 11/1999 | Hughes et al. | 361/119 |
| 5,991,313 | * 11/1999 | Tanaka et al. | 370/537 |
| 6,081,517 | * 6/2000 | Liu et al. | 370/352 |
| 6,081,530 | * 6/2000 | Wiher et al. | 370/395 |

* cited by examiner

Primary Examiner—Alpus H. Hsu
Assistant Examiner—Duc Ho
(74) Attorney, Agent, or Firm—Brooks & Kushman P.C.

(57) ABSTRACT

A system and method for collecting, integrating, and distributing video, data, and telephony signals in a fiber optic communications network for transmission along a twisted copper pair to a customer location. The video, data, and telephony signals are received by a digital subscriber loop access multiplexer and are superimposed onto the twisted copper pair using a service area interface. The system and method enables a customer to receive video, data, and telephony communication data along a single twisted copper pair at relatively high data transfer rates. Additionally, since portions of the existing communication infrastructure are used the cost of implementation is reduced.

6 Claims, 3 Drawing Sheets

Fig. 2

VDSL CABINET DESIGNS AND CONFIGURATIONS

TECHNICAL FIELD

The present invention relates to a system and method for combining video, data, and telephony signals and transmitting the superimposed signals to a customer.

BACKGROUND ART

The increasing customer demand for information supplied to homes and businesses has prompted telephone communication companies to upgrade their communication network infrastructures. In order to supply more information in the form of video, audio and telephony at higher rates, higher bandwidth communication networks are required. Conventional telephone communication network infrastructures utilize fiber optics and twisted copper pair wire to send communication data to a customer. Fiber optic cable supports a high bandwidth while, twisted copper wire supports relatively low bandwidth over long distances.

Generally, customers who are within two to three miles of a telephone company's central office (CO) are fed communication data solely using twisted copper pair. The twisted copper pair carries the phone signals as well as a –48 volts direct current (DC) power to operate and an alternating current (AC) to ring the phones. Large cables (thousands of pairs), are routed through the telephone central office switch and branch out to various manholes, poles, and cross-connect points to customer locations. For customers who are further away, a digital loop carrier (DLC) cabinet, hut, or buried vault is placed in an area and reaches up to a two-mile radius. High speed copper lines (T1, DS1, etc.) or fiber cable feed digital bits from the telephone central office to the DLC. The DLC converts the digital signal to an analog waveform required to operate the telephones. A copper cable (twisted copper pairs) relays the analog signals to a customer's home over a radius of two to three miles around the DLC site. The DLC cabinet contains its own batteries, power rectifiers, converters, and a connection for a portable generator. Additionally, the DLC cabinet is connected to an AC power feed from the local power company. For a business or residential customer requiring higher speed data than the standard telephony service, high speed copper or fiber data circuits are routed from the DLC or the CO to the customer location.

Conventional telephone networks utilizing DLCs are not capable of achieving the high bandwidths required by some customers. In order to achieve high bandwidths at a customer location, the fiber optic loop must be brought closer to the customer so that the copper cable is a sufficiently short distance and will be capable of supporting high data transfer rates. One major problem with bringing fiber cable within a short distance of a customer location is the need for an additional device which can receive digital video, data, and telephony signals from a DLC at a high data transfer rate and distribute the communication data to a plurality of customers. Conventional telephone networks utilizing DLCs do not have this capability since they are generally too far from the customer location.

As such, a need exists for a system and method for combining video, data, and telephony signals in a fiber optic communication network which brings fiber within a short distance of a customer location. The system must be capable of receiving, integrating, and distributing the video, data, and telephony signals and transmitting them along a single twisted copper pair to the customer location.

DISCLOSURE OF INVENTION

It is therefore an object of the present invention to provide a system for integrating video, data, and telephony signals emanating from different signal sources.

Another object of the present invention is to transmit the superimposed video, data, and telephony signals along a twisted copper pair in electrical communication with a customer location.

In carrying out the above objects and other objects and features of the present invention, a system for collecting, integrating, and distributing video, data, and telephony signals in a fiber optic communications network is provided. The system includes a digital subscriber line access multiplexer (DSLAM) having at least one shelf. The shelf is adapted to receive at least one of a very high data-rate digital subscriber line (VDSL) card for collecting and combining the video, data, and telephony signals from a fiber optic cable and a service area interface (SAI). The service area interface is in electrical communication with the digital subscriber line access multiplexer. The service area interface has at least one binding post for electrically connecting and transmitting the video, data, and telephony signals to a customer location.

The advantages accruing to the present invention are numerous. For example, the present invention superimposes video, data, and telephony signals onto a single twisted copper pair. The present invention reduces system implementation costs by utilizing portions of the existing communication network infrastructure.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a schematic diagram illustrating the interconnection and superposition of the video, data, and telephony signals utilizing a VDSL card housed in a DSLAM shelf and an SAI with a VDSL binding post.

BEST MODE FOR CARRYING OUT THE INVENTION

Figure 1:
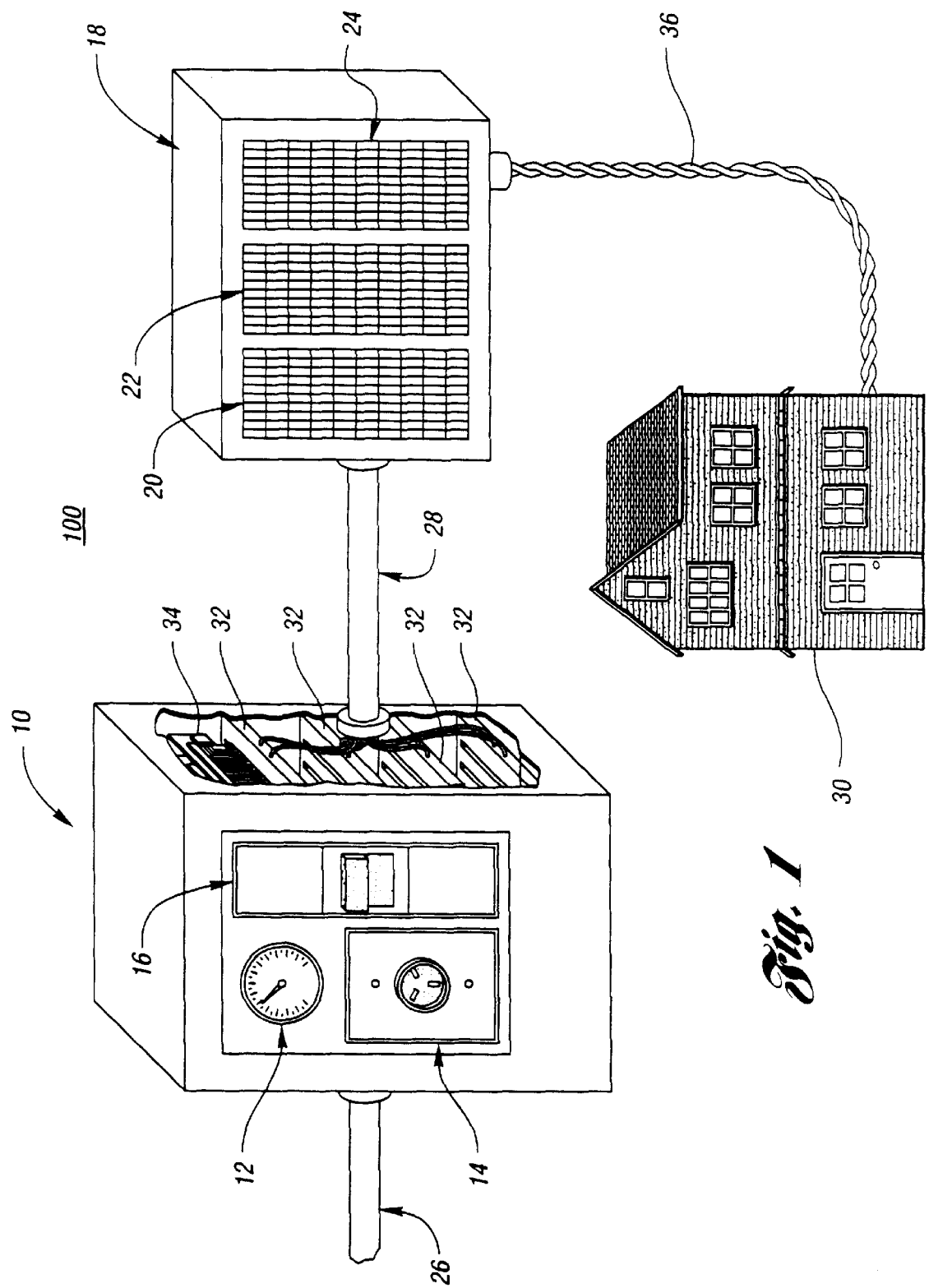
FIG. 1 is a schematic diagram of one embodiment for a communication data distribution system which integrates video, data, and telephony signals according to the present invention.

Referring now to FIG. 1, a system for distributing communication data in a fiber optic communication network according to the present invention is shown. The system, generally indicated by reference numeral 100, preferably includes a DSLAM 10, having a meter 12, power by-pass 14, a power disconnect 16, and a set of four DSLAM shelves 32. The DSLAM is configured to receive the video, data, and telephony signals via a fiber optic cable 26, which may originate at a telephone central office or an alternate distribution site. Each DSLAM shelf 32, generally contains sixteen VDSL cards 34 which receive the video, data, and telephony signals in the form of optical digital bits via the fiber optic cable 26 and convert the optical digital bits to electrical digital bits. For illustration purposes, only one VDSL card 34 is shown in FIG. 1 but it is readily apparent that the DSLAM shelf 32 may contain from one to sixteen VDSL cards depending on the size of the customer area to be served. The VDSL cards 34 are in electrical communication with a SAI 18 via an electrical cable 28. Further, the SAI 18 has a plurality of binding post blocks, namely, a VDSL binding block 20, a F1 feeder facility 22, and a F2 distribution facility 24 for receiving and transmitting the video, data, and telephony signals. The SAI 18 is located proximate to the DSLAM 10.

In operation, the DSLAM 10 receives communication data in the form of video, data, and telephony signals via the fiber optic cable 26. An optical digital to electrical digital conversion takes place on each of the four DSLAM shelves 32. Additionally, the communication data is distributed over the DSLAM shelves 32 and the VDSL cards 34 contained therein. Once the video, data, telephony signals are distributed to each VDSL card 34 on the DSLAM shelves 32 the telephony data originating from the F1 feeder facility 22 is combined with the video, data, and telephony signals on each of the VDSL cards 34. The combined video, data, and telephony signals may then be transmitted along cable 28 and to the SAI 18. Cable 28 transmits the communication data from the DSLAM 10 to the VDSL binding block 20. The F1 feeder facility 22 which is connected to the VDSL binding block 20 transmits the telephony data from the F1 feeder facility to each of the VDSL cards 34 where the telephony signal is combined with the video, data, telephony signals resident on the VDSL cards 34. The VDSL binding block 20 which is electrically connected to the F2 distribution facility 24 distributes the communication data via electrical jumpers to the F2 distribution facility 24 and then onto the customer 30 via a single twisted copper pair 36.

Figure 2:
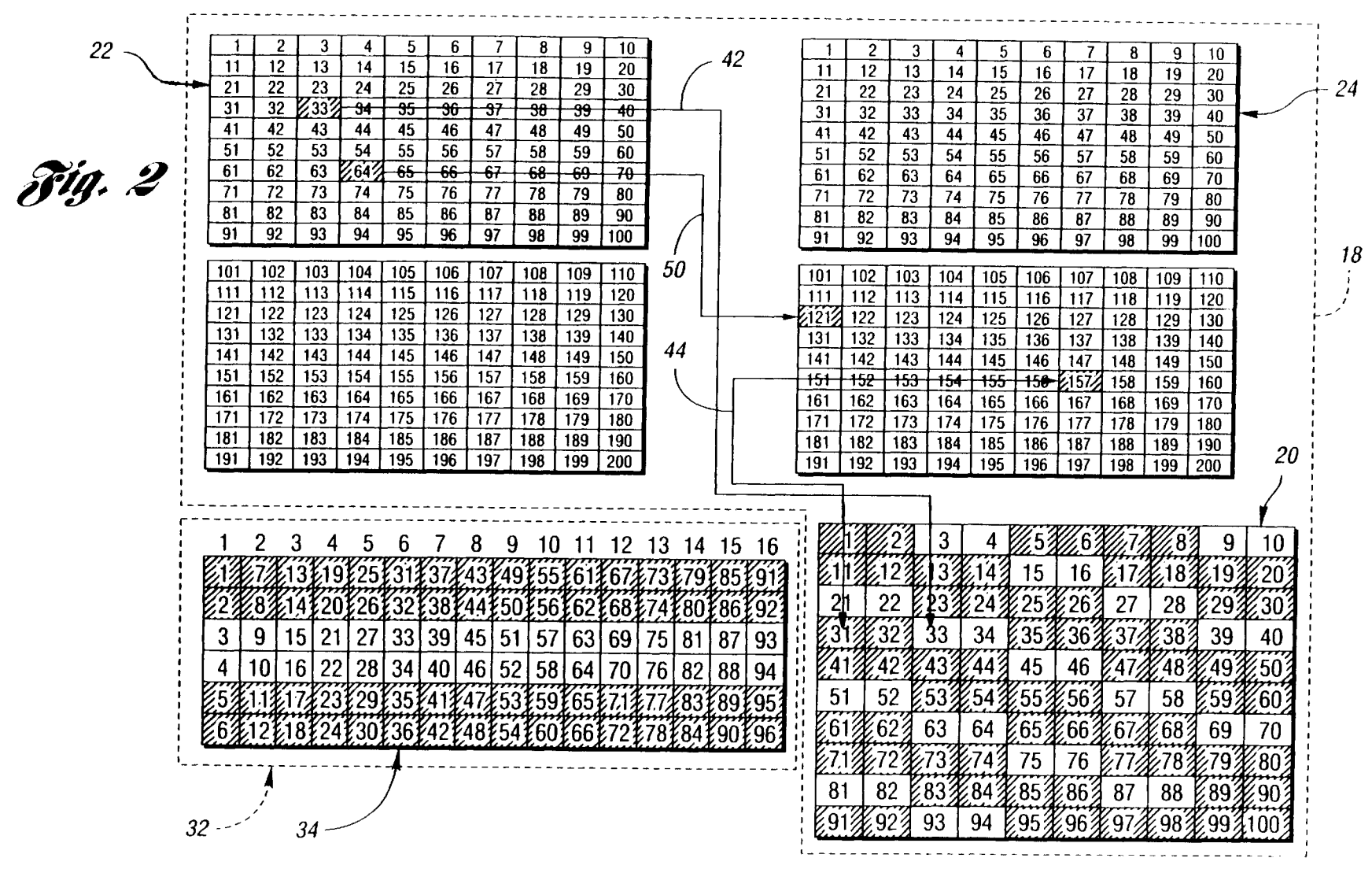

Referring now to FIG. 2, a detailed block diagram depicting how the VDSL cards 34 connect to the VDSL block binding post 20 in the SAI cabinet 18 and in turn how the VDSL block binding post 20 is connected to the F1 feeder facility 22 and the F2 distribution facility 24. F1 feeder facility 22 is shown having circuits represented by blocks numbered 1 through 200. Similarly, F2 distribution facility 24 has circuits represented by blocks numbered 1 through 200. Each circuit block has binding posts for interconnecting electrical wire, for communicating communication data from one circuit to the other. The VDSL block binding post 2C contains circuits with binding posts represented by blocks 1 through 100. The VDSL block binding post 20 is electrically connected to each VDSL card 34 on the DSLAM shelves 32 in the DSLAM 10.

With continuing reference to FIG. 2 the DSLAM shelf 32 contains 16 slots as represented by the numbers 1 through 16 at the top of each column. Each slot receives a VDSL card 34. Each VDSL card contains six terminals which include two circuits. For example, as shown in FIG. 2, slot 6 in the DSLAM shelf 32 contains a VDSL card 34 with six connector terminals which will connect to blocks 31 through 36 of slot 6. Block 31 is a data-in terminal for receiving video, data, and telephony signals as are all blocks in the first row of the DSLAM shelf 32. Block 32 is a second data-in terminal for receiving video, data, and telephony as are all blocks in the second row of the DSLAM shelf 32, block 33 is a telephony data-out terminal as are all blocks in the third row of the DSLAM shelf 32 and block 34 is also a telephony data-out terminal as are all blocks in the fourth row of the DSLAM shelf 32. Blocks 35 and 36 are not used as are all blocks in the fifth and sixth rows of the DSLAM shelf but are available for future expansion of the system. Each of the sixteen VDSL cards 34 have the same terminal configuration as described above. Further, each VDSL card 34 via its six terminals are in electrical communication with the six numerically corresponding binding posts on the VDSL binding block 20. For example, terminal one on the VDSL card 34 which is represented by block 1 on the DSLAM shelf 32 is connected to block 1 on the VDSL binding block 20, terminal two on the VDSL card 34 which is represented by block 2 on the DSLAM shelf 32 is connected to block 2 on the VDSL binding block 20, and so on such that each terminal on the sixteen VDSL cards are connected to each binding post on the VDSL binding block 20.

With a continuing reference to FIG. 2, an example, of how telephony data originating from F1 feeder facility 22 is combined with video, data, and telephony signals originating from fiber optic cable 26 and how the superimposed signal is transmitted to the F2 distribution facility 24. For example, for telephony service only the binding posts of block 64 are cross-connected via an electrical jumper 50 to the binding posts of block 121 of the F2 distribution facility 24. In this configuration telephony data only is transmitted from the F1 feeder facility 22 through the electrical jumper 50 to the F2 distribution facility 24. Once the telephony data reaches the F2 distribution facility the data is transmitted to the customer via a twisted copper pair 36 (as shown in FIG. 1). If the customer has requested telephony with video and data service the cross-connection is as follows: telephony data is picked up at the binding posts of block 33 of the F1 feeder facility 22 and cross-connected by electrical jumper 42 to the binding post of block 33 on the VDSL binding block 20. The binding post of block 33 on the VDSL binding block 20 is in electrical communication with the terminal 33 on the VDSL card 34. The telephony signal from F1 feeder facility 22 is combined with video, data, and telephony signals in the VDSL card 34. The integrated video, data, and telephoney signals are then transmitted via terminal 31 of the VDSL card 34 to the binding post of block 31 of the VDSL binding block 20. The superimposed video, data, and telephony signal is then communicated to the F2 distribution facility 24 at binding post block 157 via electrical wire jumper 44. The F2 distribution facility 24 transmits the superimposed communication data to the customer via the twisted copper pair 36.

Figure 3:
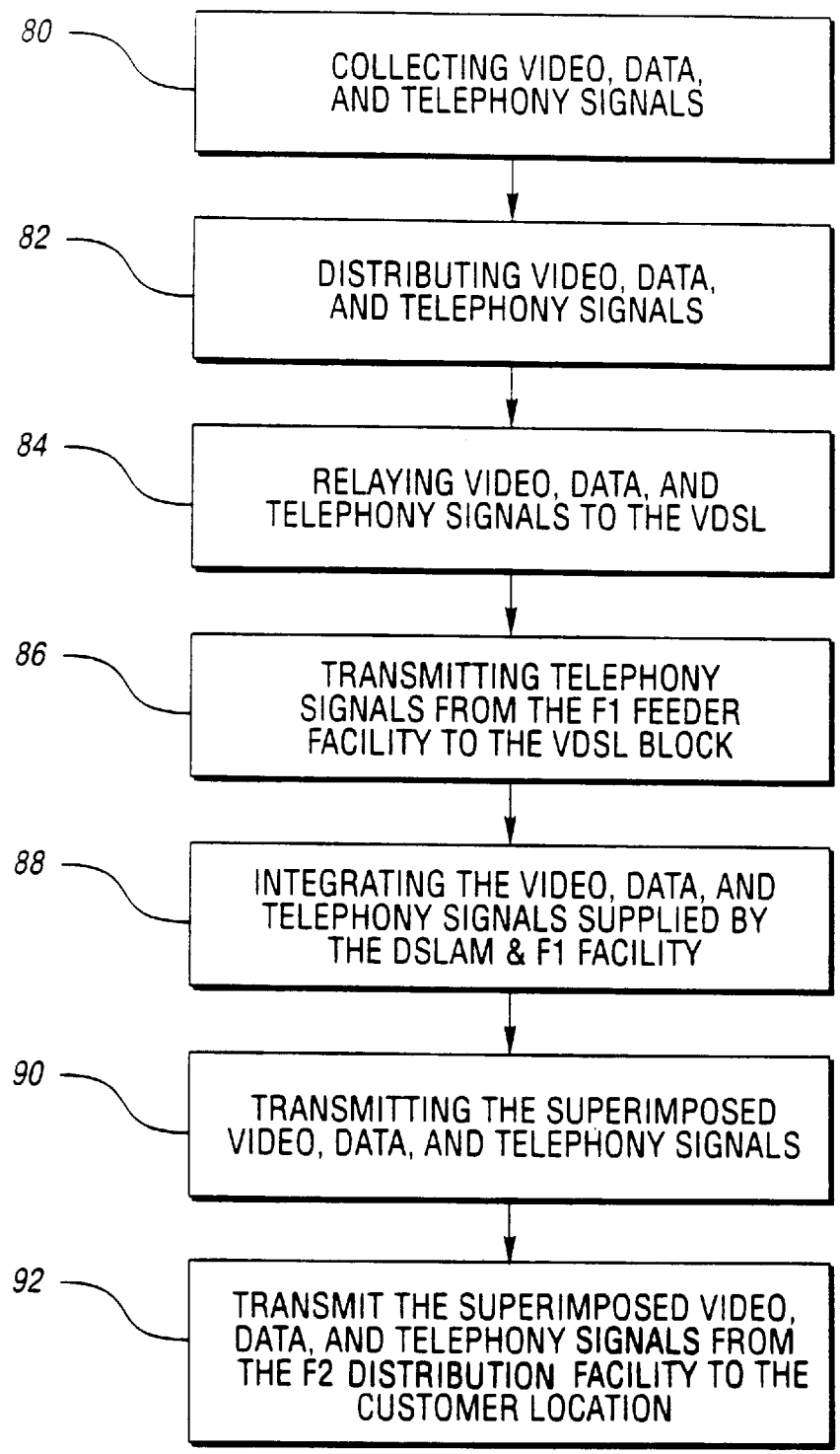
FIG. 3 is a block diagram illustrating operation of the system or method according to the present invention for collecting, integrating and transmitting video, data, and telephony signals.

Referring know to FIG. 3, a flowchart illustrating operation of a system or method for collecting, integrating and transmitting the video, data, and telephony signals. The video, data, and telephony signals are collected from a communication source, such as a telephone company central office via a fiber optic cable as represented by block 80. At block 82, the video, data, and telephony signals are distributed to each VDSL card on each of the four DSLAM shelves. Each VDSL card communicates the video, data, and telephony signals to the VDSL binding block in the service area interface as represented by block 84. Telephony signals are communicated from the F1 feeder facility to the VDSL binding block in the SAI as represented by block 86. At block 88 the video, data, and telephony signals from the DSLAM are integrated with the telephony signals from the F1 feeder facility in the VDSL card 34 (shown in FIGS. 1 and 2). The superimposed video, data, and telephony signals are transmitted to the F2 distribution facility in the SAI as represented by block 90. Once the F2 distribution facility has received the superimposed video, data, and telephony signals, the superimposed signal may be transferred to a customer location via a twisted copper pair as represented by block 92. This system or method provides high speed data transfer of communication signals to customers who require more than the typical plain old telephone service. Customers who only require plain old telephone service will receive the service in the same manner as it was provided before the implementation of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for collecting, integrating, and distributing video, data, and telephony signals in a fiber optic communications network, the system comprising:

a digital subscriber line access multiplexer including at least one very high data rate digital subscriber line (VDSL) card that receives signals from the fiber optic communications network, the VDSL card having a first terminal and a second terminal; and a service area interface having a VDSL binding block having a first binding post and a second binding post, a feeder facility binding block having a binding post, and a distribution facility binding block having a binding post, the VDSL card first terminal being in electrical communication with the VDSL binding block first binding post and the VDSL card second terminal being in electrical communication with the VDSL binding block second binding post, the VDSL binding block first binding post being cross-connected to the feeder facility binding post and the VDSL binding block second binding post being cross-connected to the distribution facility binding post to superimpose signals from the feeder facility binding block and the digital subscriber line card onto the distribution facility binding block.

2. The system of claim 1, wherein the digital subscriber line access multiplexer has four shelves and each shelf has sixteen slots for receiving sixteen VDSL cards.

3. The system of claim 1, wherein the VDSL card has six terminals and two circuits for transmitting video, data, and telephony data to the service area interface.

4. A method for collecting, integrating, and distributing video, data, and telephony signals in a fiber optic communications network, the method comprising:

collecting the video, data, and telephony signals from a fiber optic cable using a digital subscriber line access multiplexer having at least one shelf, the shelf is adapted to receive at least one VDSL card; and transmitting the video, data, and telephony signals between the digital subscriber line access multiplexer and a service area interface, wherein the service area interface is in electrical communication with the digital subscriber line access multiplexer and a customer location, the service area interface having a VDSL binding block having a first binding post and a second binding post, a feeder facility binding block having a binding post, and a distribution facility binding block having a binding post, the VDSL card first terminal being in electrical communication with the VDSL binding block first binding post and the VDSL card second terminal being in electrical communication with the VDSL binding block second binding post, the VDSL binding block first binding post being cross-connected to the feeder facility binding post and the VDSL binding block second binding post being cross-connected to the distribution facility binding post to superimpose signals from the feeder facility binding block and the digital subscriber line card onto the distribution facility binding block.

5. The method of claim 4, wherein the step of collecting further comprises a digital subscriber line access multiplexer having four shelves and each shelf has sixteen slots for receiving sixteen VDSL cards.

6. The method of claim 4, wherein the step of collecting further comprises a VDSL card having six terminals and two circuits for transmitting video, data, and telephony data to the service area interface.

* * * * *